US012773683B2

(12) United States Patent
Harle et al.

(10) Patent No.: US 12,773,683 B2
(45) Date of Patent: Oct. 27, 2026

(54) SUSPENSION OF NANOPARTICLES OF A MIXED OXIDE

(71) Applicant: RHODIA OPERATIONS, Lyons (FR)

(72) Inventors: Virginie Harle, Senlis (FR); Simon Ifrah, La Jarrie (FR); Boris Chabert, La Jarne (FR); Benjamin Faure, La Rochelle (FR); Olivier Larue, Puilboreau (FR)

(73) Assignee: RHODIA OPERATIONS, Lyons (FR)

( * ) Notice: Subject to any disclaimer, the term of this patent is extended or adjusted under 35 U.S.C. 154(b) by 670 days.

(21) Appl. No.: 17/765,977

(22) PCT Filed: Sep. 28, 2020

(86) PCT No.: PCT/EP2020/077137
§ 371 (c)(1),
(2) Date: Apr. 1, 2022

(87) PCT Pub. No.: WO2021/063900
PCT Pub. Date: Apr. 8, 2021

(65) Prior Publication Data

US 2022/0401921 A1 Dec. 22, 2022

(30) Foreign Application Priority Data

Oct. 1, 2019 (EP) .................................... 19315119

(51) Int. Cl.

| | |
|---|---|
| ***B01J 21/06*** | (2006.01) |
| ***B01J 23/00*** | (2006.01) |
| ***B01J 23/10*** | (2006.01) |
| ***B01J 35/40*** | (2024.01) |
| ***B01J 35/45*** | (2024.01) |
| ***B01J 35/61*** | (2024.01) |
| ***B01J 35/63*** | (2024.01) |
| ***B01J 35/77*** | (2024.01) |
| ***B01J 37/02*** | (2006.01) |

(52) U.S. Cl.

CPC ........... *B01J 21/066* (2013.01); *B01J 23/002* (2013.01); *B01J 23/10* (2013.01); *B01J 35/40* (2024.01); *B01J 35/45* (2024.01); *B01J 35/613* (2024.01); *B01J 35/635* (2024.01); *B01J 35/77* (2024.01); *B01J 37/0203* (2013.01); *B01J 2235/15* (2024.01); *B01J 2523/3706* (2013.01); *B01J 2523/3712* (2013.01); *B01J 2523/48* (2013.01); *B01J 2523/49* (2013.01)

(58) Field of Classification Search

CPC ............ B01J 2523/3712; B01J 2523/48; B01J 35/635; B01J 35/613

See application file for complete search history.

(56) References Cited

U.S. PATENT DOCUMENTS

| | | | | |
|---|---|---|---|---|
| 7,713,908 | B2 | 5/2010 | Yamamoto et al. | |
| 8,173,087 | B2 | 5/2012 | Wei et al. | |
| 10,207,253 | B1 | 2/2019 | Inokawa et al. | |
| 2006/0115397 | A1 | 6/2006 | Hedouin | |
| 2007/0264486 | A1 | 11/2007 | Verdier | |
| 2009/0274599 | A1 * | 11/2009 | Larcher | B01J 37/03 423/213.2 |
| 2013/0142713 | A1 | 6/2013 | Ifrah et al. | |
| 2017/0001173 | A1 * | 1/2017 | Zhao | B01J 23/10 |

FOREIGN PATENT DOCUMENTS

| | | | | | |
|---|---|---|---|---|---|
| EP | 1527018 | A2 | | 5/2005 | |
| EP | 1621251 | A1 | | 2/2006 | |
| EP | 2953900 | | * | 9/2018 | B01D 53/945 |
| FR | 3050450 | | * | 10/2017 | B01D 53/94 |
| KR | 20180137533 | A | | 12/2018 | |
| WO | 2006030120 | A1 | | 3/2006 | |
| WO | 2011138255 | A2 | | 11/2011 | |
| WO | 2014125296 | A1 | | 8/2014 | |
| WO | 2016037059 | A1 | | 3/2016 | |
| WO | 2017056067 | A1 | | 4/2017 | |
| WO | 2017072509 | A1 | | 5/2017 | |
| WO | 2017187086 | A1 | | 11/2017 | |
| WO | WO-2017185224 | A1 | * | 11/2017 | B01J 37/03 |

OTHER PUBLICATIONS

S. Brunauer et al., "Adsorption of Gases in Multimolecular Layers," The Journal of the American Chemical Society, vol. 60, pp. 309-319, Feb. 1938 (11 pages).
S. Lowell et al., "Powder Surface Area and Porosity", 2nd Edition, ISBN 978-94-015-7955-1, Chapter 4, 1984 (23 pages).
International Search Report issued in corresponding International Application No. PCT/EP2020077137; mailed Dec. 9, 2020 (3 pages).
Written Opinion of the International Searching Authority issued in corresponding International Application No. PCT/EP2020077137; dated Dec. 9, 2020 (6 pages).
Office Action issued in Canadian patent application No. 3,152,254, mailed on Oct. 15, 2025 (5 pages).
Office Action issued in Korean Application No. 10-2022-7014215, mailed on Oct. 20, 2025 (36 pages).

* cited by examiner

*Primary Examiner* — Anthony J Zimmer
*Assistant Examiner* — Eric Scott Sherman
(74) *Attorney, Agent, or Firm* — Osha Bergman Watanabe & Burton LLP

(57) ABSTRACT

The present invention relates to a suspension of nanoparticles of a mixed oxide based on cerium and zirconium. It also relates to the use of said suspension for the preparation of a catalysed gasoline particulate filter.

19 Claims, No Drawings

SUSPENSION OF NANOPARTICLES OF A MIXED OXIDE

The present application is a U.S. national stage entry under 35 U.S.C. § 371 of International Application No. PCT/EP2020/077137 filed on Sep. 28, 2020, which claims the priority of European patent application EP 19315119.8 filed on Oct. 1, 2019, the content of which being entirely incorporated herein by reference for all purposes. In case of any incoherency between the present application and the EP application-that would affect the clarity of a term or expression, it should be made reference to the present application only.

The present invention relates to a suspension of nanoparticles of a mixed oxide based on cerium and zirconium. It also relates to the use of said suspension for the preparation of a catalysed gasoline particulate filter (cGPF).

FIELD OF THE INVENTION

With current legislations in Europe and China requiring compliance with a particle number (PN) limit, particulate filters are applied for gasoline engines, in particular for gasoline direct injection technologies (GDI). It is favorable to combine the catalytic activity for the conversion of gaseous pollutants with the reduction of particulates in one step. This can be achieved with catalysed gasoline particulate filters (cGPF). As a consequence of this, the cGPFs have been developed and offer an effective route to reduce the number of particles and pollutants under all driving conditions. The cGPF is also en efficient means to optimize the after-treatment layout with reduction of the number of catalytic components in the exhaust line.

The working principle of the cGPF is comparable to the well established catalysed diesel particulate filters (cDPF). Particles are removed from the exhaust by physical filtration using a honeycomb structure similar to an emissions catalyst substrate but with the channels blocked at alternate ends. The exhaust gas is thus forced to flow through the porous walls between the channels and the particles are deposited on and in the walls. The catalytic coating provides Three Way Catalytic (TWC) activity and converts carbon monoxide (CO), unburnt hydrocarbons (HC) and nitrogen oxides ($NO_x$) simultaneously. The TWC coating also support the soot burn in the cGPF. Filter substrates for gasoline engines are typically made of cordierite but other substrate composition such as silicon carbide or aluminium titanate are also possible without any restriction of the invention. Compared to a cDPF the particle size distribution in gasoline exhaust is different (shifted to smaller particles) as a consequence narrower porosities filter are needed. This is well known that coating of narrow porosity filter is more challenging because the back-pressure has to be minimized to limit negative impact on engine efficiency, fuel consumption and $CO_2$ emission. The temperature of exhaust gases for gasoline engines are in general higher than for diesel engines—as a consequence the average operation temperature is typically higher for a cGPF. This higher temperature also allows an easier regeneration of the filter compared to diesel. Thanks to the presence of the TWC washcoat, part of the soot can be burnt continuously. On regular basis a cDPF regeneration is triggered to burn completely the soot.

The preparation of a cGPF usually involves the following steps: contacting a porous filter substrate with a dispersion of a catalytic composition; drawing the catalytic composition into the channels of the filter substrate by application of a vacuum; drying and calcining the coated filter substrate. The dispersion is typically made by mixing a solution of a noble metal (preference platinum, palladium and/or rhodium) with a mixed oxide based on cerium and zirconium, alumina and other inorganic and/or organic ingredients.

The mixed oxide based on cerium and zirconium is usually commercialized in the solid form. Yet, the preparation of the catalyst dispersion requires the additional step of dispersing the mixed oxide in a liquid. There is therefore a need for a suspension of said mixed oxide in a liquid medium that could be used directly in the preparation of the catalyst dispersion. The suspension of the mixed oxide must exhibit a compromise of properties so that it can be easily used and processed during the preparation of the catalytical dispersion. In particular, said suspension must exhibit a viscosity that is suitable for the preparation of the catalytical dispersion and the use to prepare the cGPF. The proportion of solid in the suspension should also be high enough for the sake of a convenient use and of productivity.

The characteristics of the mixed oxide have also an influence on the performance of the cGPF. For instance, in order to reduce the back pressure increase due to the presence of a washcoat on the filter, the washcoat must be located within the filter as uniformly as possible. The particles of the mixed oxide should also easily impregnate the filter while keeping a high thermal resistance.

The suspension of the present invention aims at such a compromise.

TECHNICAL BACKGROUND

WO 2017/056067 discloses a cGPF prepared with a catalytical dispersion with a d50 around 5 μm.

U.S. Pat. No. 8,173,087 discloses an catalytical dispersion but it does not disclose the suspension of the invention.

U.S. Pat. No. 10,207,253 B1 discloses a catalytic composition comprising particles of $CeO_2$ and of $ZrO_2$ that may be in the form of separate nanoparticles. There is no disclosure of a mixed oxide based on cerium and zirconium.

WO 2006/030120 discloses a mixed oxide used to coat a filter. It does not disclose the suspension as claimed.

U.S. Pat. No. 7,713,908 discloses a suspension of metal oxides powder with a diameter of not more than 50 nm. The pH of the suspension may be 5 to 9 for the combination of the mixed oxide based on cerium and zirconium and alumina.

WO 2017/187086 discloses a mixed oxide based on cerium and on zirconium. WO 2017/187086 specifies that the mixed oxide may be ground to a D50 between 500 nm and 50000 nm but there is no mention of a suspension nor of any acid. For the weathering test with rhodium which uses a suspension, D50 is between 1000 nm and 20000 nm, so out of the range claimed. WO 2017/187086 therefore does not disclose the suspension as claimed.

The calcinations, more particularly the calcinations after which the values of specific surface area or of porosity are given, are calcinations in air, unless otherwise mentioned. It is also specified, for the continuation of the description, that, unless otherwise indicated, in the ranges of values which are given, the values at the limits are included. This applies also to the expressions comprising "at least" or "at most".

BRIEF DESCRIPTION OF THE INVENTIONS

The invention relates to a suspension of particles as disclosed in any one of claims 1-34. The suspension comprises particles of at least one mixed oxide of zirconium, of cerium, of optionally lanthanum and optionally of at least one rare-earth element other than cerium and other than lanthanum (noted RE), in an aqueous liquid medium comprising an acid which is either a mineral acid or a carboxylic acid containing from 2 to 12 carbon atoms, preferably from 2 to 8 carbon atoms, the suspension having the following characteristics:

- the pH of the suspension is between 2.0 and 7.0, this latter value being excluded, more particularly between 3.0 and 6.0;
- the proportion of the mixed oxide is between 20.0 wt % and 50.0 wt %, more particularly between 25.0 wt % and 50.0 wt %, even more particularly between 30.0% and 45.0% or between 35.0 wt % and 45.0 wt %;
- the specific surface area of the suspension is higher than 15 $m^2/g$ if the mixed oxide does not comprise La nor RE and higher than 21 $m^2/g$ if the mixed oxide comprises La and/or RE, the specific surface area being determined after calcination in air at 1100° C. for 4 hours of the solid isolated from the suspension;

wherein:

- the particles of the mixed oxide exhibit a D50 between 20.0 nm and 900 nm, more particularly between 20.0 nm and 800.0 nm, more particularly between 20.0 nm and 500.0 nm, even more particularly between 20.0 nm and 400.0 nm, even more particularly between 20.0 nm and 300.0 nm or between 20.0 nm and 200.0 nm or between 20.0 and 100.0 nm;
- the proportions of the elements Ce, Zr, La and RE, expressed by weight of oxide with respect to the mixed oxide, are the following:
  - between 20.0 wt % and 55.0 wt % of cerium;
  - up to 10.0 wt % of lanthanum;
  - up to 15.0 wt % of the rare earth element(s) (RE(s)) other than cerium and other than lanthanum;
  - the remainder as zirconium.

The invention also relates to a suspension consisting of:

- particles of at least one mixed oxide of zirconium, of cerium, of optionally lanthanum and optionally of at least one rare-earth element other than cerium and other than lanthanum (RE);
- an aqueous liquid medium;
- an acid which is either a mineral acid or a carboxylic acid containing from 2 to 12 carbon atoms, preferably from 2 to 8 carbon atoms;

the suspension having the following characteristics:

- the pH of the suspension is between 2.0 and 7.0, this latter value being excluded, more particularly between 3.0 and 6.0;
- the proportion of the mixed oxide is between 20.0 wt % and 50.0 wt %, more particularly between 25.0 wt % and 50.0 wt %, even more particularly between 30.0% and 45.0% or between 35.0 wt % and 45.0 wt %;
- the specific surface area of the suspension is higher than 15 $m^2/g$ if the mixed oxide does not comprise La nor RE and higher than 21 $m^2/g$ if the mixed oxide comprises La and/or RE, the specific surface area being determined after calcination in air at 1100° C. for 4 hours of the solid isolated from the suspension;

wherein:

- the particles of the mixed oxide exhibit a D50 between 20.0 nm and 900 nm, more particularly between 20.0 nm and 800.0 nm, more particularly between 20.0 nm and 500.0 nm, even more particularly between 20.0 nm and 400.0 nm, even more particularly between 20.0 nm and 300.0 nm or between 20.0 nm and 200.0 nm or between 20.0 and 100.0 nm;

- the proportions of the elements Ce, Zr, La and RE, expressed by weight of oxide with respect to the mixed oxide, are the following:
  - between 20.0 wt % and 55.0 wt % of cerium;
  - up to 10.0 wt % of lanthanum;
  - up to 15.0 wt % of the rare earth element(s) (RE(s)) other than cerium and other than lanthanum;
  - the remainder as zirconium.

The invention also relates to a process of preparation of the suspension. According to this process, a dispersion comprising a mixed oxide M dispersed in an aqueous liquid medium comprising the acid undergoes a mechanical treatment so as to reduce the size of the particles of the mixed oxide.

The invention also relates to the use of the suspension for the preparation of a cGPF and to a method of preparation of a catalytic composition wherein the suspension is brought into contact with at least one mineral material and optionally at least one PGM.

More explicit details about these inventions are given below.

DESCRIPTION

The term "suspension" designates a liquid medium in which solid particles are dispersed.

The suspension comprises in an aqueous liquid medium at least one mixed oxide of zirconium, of cerium, optionally of lanthanum and optionally of at least one rare-earth element other than cerium and other than lanthanum (RE). The proportion of the mixed oxide in the suspension is between 20.0 wt % and 50.0 wt %, more particularly between 25.0 wt % and 50.0 wt %, even more particularly between 30.0% and 45.0% or between 35.0 wt % and 45 wt %. This proportion in % is expressed by weight of the mixed oxide relative to the total weight of the suspension. For example, a proportion of mixed oxide of 40.0 wt % corresponds to 40.0 g of mixed oxide per 100.0 g of suspension.

The mixed oxide according to the invention is characterized first of all by the nature and proportions of its components. The mixed oxide is based upon the elements Ce, Zr, optionally La and optionally at least one RE. For instance, the mixed oxide may be based on the elements Ce and Zr on the elements Ce, Zr and La or on the elements Ce, Zr, La and RE.

The proportion of cerium in the mixed oxide may vary in a broad range. Indeed, the proportion of cerium is between 20.0 wt % and 55.0 wt %. This proportion may be between 30.0 wt % and 55.0 wt %, more particularly between 30.0 wt % and 45.0 wt %. This proportion may also be between 25.0 wt % and 35.0 wt %.

The proportion of lanthanum in the mixed oxide is up to 10.0 wt %. This proportion may be between 0 and 10.0 wt %, more particularly between 1.0 wt % and 10.0 wt %.

The mixed oxide may also comprise at least one rare-earth element other than cerium and other than lanthanum (RE). RE designates a rare earth element which is not cerium nor lanthanum. RE may be selected in the group consisting of dysprosium (Dy), erbium (Er), europium (Eu), gadolinium (Gd), holmium (Ho), lutetium (Lu), neodymium (Nd), praseodymium (Pr), promethium (Pm), samarium (Sm), scandium (Sc), terbium (Tb), thulium (Tm), ytterbium (Yb) and yttrium (Y). RE may be more particularly selected in the group consisting of Nd, Y and Pr. The mixed oxide may comprise one or two rare-earth element(s) other than cerium and other than lanthanum. The total proportion of the rare-earth element(s) other than cerium and other than lanthanum is up to 15.0 wt %, more particularly up to 10.0 wt %.

The mixed oxide may also comprise the element hafnium. Indeed, this element is usually present in combination with zirconium in the ores which are present in the natural state. The relative proportion of hafnium with respect to zirconium depends on the ore from which zirconium is extracted. The relative proportion by weight Zr/Hf in some ores may be around 50/1. Thus baddeleyite contains roughly 98% of $ZrO_2$ and 2% of $HfO_2$. The proportion of hafnium is lower or equal to 2.5 wt %, even lower or equal to 2.0 wt %.

The above mentioned elements are generally present in the mixed oxide as oxides. They may nonetheless be also partially present in the form of hydroxides or oxyhydroxides. Thus, the elements Ce and Zr, and La or RE, if any, and Hf, if any, are present in the mixed oxide as oxides but they may also be present in the mixed oxide as oxides and also partially in the form of hydroxides or oxyhydroxides.

As usual in the field of mixed oxides, the proportions of the elements are given by weight of oxide relative to the mixed oxide as a whole. For the calculations of these proportions, the following oxides are considered: $CeO_2$, $ZrO_2$, $HfO_2$, $La_2O_3$, $RE_2O_3$ for all REs except for Pr for which $Pr_6O_{11}$ is considered. Thus, as an example, a proportion of 20.0 wt % of cerium means a proportion of 20.0 wt % of $CeO_2$ in the mixed oxide. The proportions of the elements are determined by the usual analytical methods like X-ray fluorescence or by Inductively Coupled Plasma Mass Spectrometry.

The mixed oxide of the invention comprises the above mentioned elements with the above mentioned proportions but it may also additionally comprise other elements like impurities. The impurities may stem from the raw materials or starting materials used in the process of preparation of the mixed oxide. The total proportion of the impurities may generally less than or equal to 0.25 wt % 0.25 wt %), more particularly less than or equal to 0.20 wt % 0.20 wt %), with respect to the mixed oxide.

Zirconium oxide is the remainder of the composition. The proportion by weight of zirconium is as remainder to 100% of the other elements (Ce, La, RE if any, Hf if any) of the mixed oxide. The proportion of zirconium in the mixed oxide is typically higher than 35.0 wt %, more particularly higher than 45.0 wt %, even more particularly higher than 50.0 wt %. The proportion of zirconium is typically lower than 79.0 wt %.

According to an embodiment, the mixed oxide exhibits a weight ratio $ZrO_2/CeO_2$ higher than 1.0, typically higher than 1.5.

The aqueous liquid medium comprises an acid which is either a mineral acid or a carboxylic acid containing from 2 to 12 carbon atoms, preferably from 2 to 8 carbon atoms. The mineral acid is for instance nitric acid. The proportion of the acid is between 0.01 wt % and 10.0 wt % depending on acid used, more particularly between 0.5 wt % and 6.0 wt %, expressed by weight of acid with respect to the whole suspension.

According to an embodiment, the suspension does not comprise any metal oxide other than the mixed oxide above disclosed. A metal oxide is defined as an oxide of at least one metal. The metal may more particularly be selected in the group consisting of Al, Zr or Ti. The metal oxide may be for instance alumina, zirconia or titania.

The suspension is also characterized by a high specific surface area. The specific surface area (BET) of the suspension is higher than 15 $m^2/g$ if the mixed oxide does not comprise La nor RE, the specific surface area being determined after calcination in air at 1100° C. for 4 hours of the solid isolated from the suspension. This is the case for a mixed oxide of cerium and zirconium. The specific surface area (BET) of the suspension is higher than 21 $m^2/g$ if the mixed oxide comprises La and/or RE, the specific surface area being determined after calcination in air at 1100° C. for 4 hours of the solid isolated from the suspension. This is the case for instance for a mixed oxide of cerium, zirconium and lanthanum or a mixed oxide of cerium, zirconium, lanthanum and at least one rare-earth other then cerium and other than lanthanum. In both cases, this specific surface is generally lower and equal to 40 $m^2/g$, more particularly lower and equal to 35 $m^2/g$, even more particularly lower and equal to 30 m2/g.

After calcination in air at 1000° C. for 4 hours, the suspension may also exhibit a specific surface area (BET) of at least 35 $m^2/g$, more particularly of at least 40 $m^2/g$, the specific surface area being determined after calcination in air at 1000° C. for 4 hours of the solid isolated from the suspension. This specific surface is generally lower and equal to 70 $m^2/g$, more particularly lower and equal to 65 $m^2/g$, even more particularly lower and equal to 60 $m^2/g$.

According to a particular embodiment, the specific surface areas of the suspension at 1100° C. and at 1000° C. disclosed above are determined on a solid isolated by the following method comprising the following steps:

(i) the solid is isolated from the suspension;

(ii) then, the solid is dried in air at 500° C. for 1 hour;

(iii) the dried solid is calcined in air respectively at 1100° C. for 4 hours or at 1000° C. for 4 hours.

Thus, the following steps are performed on the suspension to determine the specific surface area at respectively 1100° C./4 h or at 1000° C./4 h: (i) 4 (ii) 4 (iii) 4 measurement of the specific surface area (BET).

To be clear, the expression "specific surface area (BET) of the suspension" thus refers to the specific surface area (BET) of the solid (mixed oxide) isolated from the suspension.

The term "specific surface area (BET)" is, understood to mean the BET specific surface area determined by nitrogen adsorption. The specific surface area is well-known to the skilled person and is measured according to the Brunauer-Emmett-Teller method. The theory of the method was originally described in the periodical "The Journal of the American Chemical Society, 60, 309 (1938)". More detailed information about the theory may also be found in chapter 4 of "Powder surface area and porosity", $2^{nd}$ edition, ISBN 978-94-015-7955-1. The method of nitrogen adsorption is disclosed in standard ASTM D 3663-03 (reapproved 2008). In practice, the specific surface areas (BET) may be determined automatically with the appliance Flowsorb II 2300 or the appliance Tristar 3000 of Micromeritics according to the guidelines of the constructor. They may also be determined automatically with a Macsorb analyzer model 1-1220 of Mountech according to the guidelines of the constructor. Prior to the measurement, the samples are degassed by heating at a temperature of at most 300° C. to remove the adsorbed volatile species, optionally under vacuum. More specific conditions may be found in the examples.

The suspension may also exhibit a specific porosity measured by mercury porosimetry. Indeed, the suspension may also exhibit a pore volume determined by mercury porosimetry for the pores having a diameter below 300 nm (noted $PV_{0\text{-}300\ nm}$) which is greater than 0.15 mL/g, more particularly greater than 0.25 mL/g. $PV_{0\text{-}300\ nm}$ may be between 0.15 and 0.80 mL/g.

The suspension may also exhibit a total pore volume TPV greater than 0.50 mL/g, more particularly greater than 0.60 mL/g. TPV may be between 0.50 and 2.00 mL/g, more particularly between 0.50 and 1.50 mL/g, even more particularly between 0.50 and 1.30 mL/g.

According to a particular embodiment, the pore volumes disclosed above are determined according to the following steps:

(i) the solid is isolated;

(ii) the solid is dried in air at 500° C. for 1 hour.

Thus, the following steps are performed on the suspension to determine the porosity: (i)→(ii)→measurement of the porosity.

As for the specific surface area, the pores volumes thus refer to the pore volumes of the solid (mixed oxide) isolated from the suspension.

The methods disclosed above for the measurement of the specific surface areas and of the pore volumes comprise a step (i) in which the solid is isolated from the suspension. Step (i) is conveniently performed by filtration. In step (ii), the solid isolated from step (i) is dried in air at 500° C. for 1 hour. Step (ii) helps remove the rest of the aqueous liquid medium comprising the acid. After the drying step (ii), the solid may form crumbs which may conveniently be deagglomerated. Deagglomeration is conveniently performed using a mortar.

Mercury porosimetry is a standard technique used in the field of porous catalysts and consists in the progressive intrusion of mercury into the pores of a porous structure under controlled pressures. The porosity is measured by mercury intrusion according to the well-known techniques in the field. The porosity may be determined according to the guidelines of the constructor using a Micromeritics V 9620 Automatic Mercury Porosimeter. The porosimeter comprises a powder penetrometer. The method is based on the determination of the pore volume as a function of the pore size (V=f(d), V denoting the pore volume and d denoting the pore diameter). From the data, it is possible to obtain a curve (C) giving the derivative dV/d log D. From curve (C), the pore volume $PV_{0-300\ nm}$ and the total pore volume TPV, both measured after calcination in air at 500° C. for 1 hour, are determined. The procedures given in the examples are preferably followed.

The mixed oxide is in the form of particles which exhibit a D50 between 20.0 nm and 900 nm. D50 may be more particularly between 20.0 nm and 800.0 nm, more particularly between 20.0 nm and 500.0 nm, even more particularly between 20.0 nm and 400.0 nm, even more particularly between 20.0 nm and 300.0 nm or between 20.0 nm and 200.0 nm or between 20.0 and 100.0 nm.

The particles preferably exhibit a D90 lower than 1000 nm. D90 may be more particularly between 50 nm and 1000 nm, more particularly between 50 nm and 700 nm, even more particularly between 50 nm and 500.0 nm. D90 is preferably below 200 nm or even below 100 nm.

According to an embodiment, the suspension exhibits a D50 between 20 nm and 100 nm and a D90 between 50 nm and 120 nm.

According to another embodiment, the suspension exhibits a D50 between 40 nm and 100 nm and a D90 between 50 nm and 120 nm.

D50 and D90 are determined from a distribution (in volume) of the size of the particles obtained with a laser diffraction particle size analyzer. D50 and D90 have the usual meaning used in the field of particle size analysis. See for instance https://www.horiba.com/fileadmin/uploads/Scientific/Documents/PSA/PSA Guide book.pdf. D50 (median) is defined as the size value corresponding to the cumulative distribution at 50%. Similarly, D90 is defined as the size value corresponding to the cumulative distribution at 90%.

D50 and D90 may be determined with a Beckman Coulter LS 13320 laser diffraction particle size analyzer (Beckman coulter, Inc) using the standard procedure predetermined by the instrument software. The Fraunhofer mode may be used following the guidelines of the constructor (https://www.beckmancoulter.com/wsrportal/techdocs?docname=B05577AB.pdf). A relative refractive index of 1.6 is used. The method disclosed in the examples may conveniently be used.

The suspension also comprises an acid which is either a mineral acid or a carboxylic acid containing from 2 to 12 carbon atoms, preferably from 2 to 8 carbon atoms. The mineral acid may be more particularly nitric acid. The carboxylic acid may also contain at least one functional group other than COOH. The functional group may be selected in the group consisting of OH, C═O, anhydride and ester groups. The carboxylic acid may be a monocarboxylic acid, a di- or tri-carboxylic acid or a alpha-hydroxycarboxylic acid. The carboxylic acid may be more particularly of formula: $R^1$—COOH wherein $R^1$ is a linear or branched alkyl radical containing from 1 to 11 carbon atoms, more particularly from 1 to 7. More particularly, the carboxylic acid may be selected in the group consisting of: acetic acid, propionic acid, butanoic acid, hexanoic acid, oxalic acid, malonic acid, succinic acid, glutamic acid, adipic acid, maleic acid and citric acid. The carboxylic acid is typically acetic acid.

The aqueous liquid medium comprises water. According to an embodiment, water is the major constituent of the liquid medium. The aqueous liquid medium may for instance be water.

According to another embodiment, the aqueous liquid medium may comprise at least one other liquid which is miscible with water. The other liquid may for instance be an organic liquid such as an alcohol, an ester or a ketone. The nature and quantity of the other liquid should preferably be such that it does not affect the stability of the suspension. The weight ratio water/other liquid(s) is preferably between 100/0 to 80/20, more preferably between 100/0 and 90/10, even more preferably between 100/0 and 95/5.

The aqueous liquid medium also comprises the acid. It may also comprise the impurities which are present in the mixed oxide which is mechanically treated. The impurities may be released during the mechanical treatment.

The pH of the suspension is between 2.0 and 7.0, this latter value being excluded ($2.0 \leq pH < 7.0$). The pH of the suspension may for particularly be between 3.0 and 6.0. It has been observed that the pH has an impact on the ability to decrease the reach the claimed values of D50 and D90 and also on the viscosity of the suspension.

The suspension typically exhibits a viscosity V which is lower than 1000 cP, more particularly lower than 500 cP, even more particularly lower than 100 cP. V is measured at 20° C. with a rheometer using a cylindrical couette geometry. The sample was first subjected to a shear rate increasing from 1 $s^{-1}$ to 100 $s^{-1}$ over a ramp time of 5 minutes, then to a shear rate decreasing from 100 $s^{-1}$ to 1 $s^{-1}$ also over 5 minutes. The viscosity value (V) which is retained is the value measured at a shear rates of 10 $s^{-1}$ during the decrease of the shear rate.

As regards the use of the suspension according to the invention, this comes within the field of motor vehicle pollution control catalysis. The suspension of the invention may be used for the preparation of a cGPF.

The cGPF is typically formed of a porous substrate and a coating comprising the mixed oxide applied on at least one part of the porous substrate. The coating can be made of one or more layers, at least one the layer being made of a catalytic composition comprising the mixed oxide. The coating layer is made of a catalytic composition which is similar to the one used in the TWC technologies.

The preparation of a cGPF usually involves the following steps: (i) contacting the porous filter substrate with an aqueous dispersion of a catalytic composition; (ii) drawing the catalytic composition into the channels of the filter and/or into the porous substrate, preferably by application of a vacuum; (iii) drying and calcining the coated filter.

About the Porous Substrate

The porous substrate usually is made of a ceramic material such as, for example, cordierite, silicon carbide, silicon nitride, zirconia, mullite, spodumene, alumina-silica-magnesia, zirconium silicate, and/or aluminium titanate, typically cordierite or silicon carbide. The porous substrate appears to be quite similar to a substrate typically used in emission treatment systems of gasoline engines. For example, the porous substrate may exhibit a conventional honey-comb structure.

The filter may take the form of a "through-flow filter" or "wall-flow filter" (WFF). The filter is preferably a wall-flow filter. Wall-flow filters work by forcing the flow of exhaust gases (including particulate matter) to pass through walls formed of a porous material.

A wall-flow filter typically has a first face and a second face defining a longitudinal direction therebetween. In use, one of the first face and the second face will be the inlet face for exhaust gases and the other will be the outlet face for the treated exhaust gases.

A wall-flow filter typically has first and second pluralities of channels extending in the longitudinal direction. The first plurality of channels is open at the first face and closed at the second face. The second plurality of channels is open at the second face and closed at the first face. The channels are preferably parallel to each other to provide a constant wall thickness between the channels As a result, gases entering one of the plurality of channels cannot leave the monolith without diffusing through the channel walls into the other plurality of channels. The channels are closed with the introduction of a sealant material into the open end of a channel. Preferably the number of channels in the first plurality is equal to the number of channels in the second plurality, and each plurality is evenly distributed throughout the monolith. The channels can have cross sections that are rectangular, square, circular, oval, triangular, hexagonal, or other polygonal shapes.

The substrate is often made of cordierite and exhibits a minimum porosity to be compatible with preparation of an efficient cGPF with low back pressure.

About the Catalytic Composition

The coating (commonly known as "washcoat") is applied on a least one part of the substrate. The coating layer is formed from a catalytic composition prepared from the suspension of the invention. Typically the catalytic composition is prepared by bringing into contact the suspension of the invention and at least one mineral material and optionally at least one PGM. The catalytic composition thus typically comprises:

(i) the mixed oxide (as defined above);

(ii) at least one mineral material; and (ii) optionally at least one PGM.

The mineral material can be selected in the group consisting of optionally doped alumina, titanium oxide, cerium oxide, zirconium oxide, silica, spinels, zeolites, silicates, crystalline silico-aluminum phosphates and crystalline aluminum phosphates. The composition can also comprise other additives which are specific to each formulator: $H_2S$ scavenger, organic or inorganic modifier having the role of facilitating the coating, colloidal alumina, and the like. The coating also comprises at least one dispersed platinum group metal (PGM), which is more particularly selected in the group consisting of Pt, Rh or Pd. The PGM is generally in the form of a salt, e.g. in the form of a nitrate.

The invention thus also relates to the method of preparation of a catalytic composition wherein the suspension of the invention is brought into contact with at least one mineral material and optionally at least one PGM. The mineral material may be in the form of a solid or of a dispersion in an aqueous liquid medium. As the proportion of the mixed oxide in the suspension is usually already high, the mineral material is preferably in the fom of a dispersion in an aqueous liquid medium. In addition, the method of preparation of the catalytic composition usually comprises the addition of a liquid, preferably water, to ensure a good mixing of the components of the catalytic composition.

The PGM may be in the form of a solid or of an aqueous solution.

The role of the coating is to convert, by chemical reactions, certain pollutants of the exhaust gas, in particular carbon monoxide, unburnt hydrocarbons and nitrogen oxides, into products which are less harmful to the environment. The chemical reactions involved may be the following ones:

$$2\,CO + O_2 \longrightarrow 2\,CO_2$$

$$2\,NO + 2\,CO \longrightarrow N_2 + 2\,CO_2$$

$$4\,C_xH_y + (4x+y)\,O_2 \longrightarrow 4x\,CO_2 + 2y\,H_2O$$

The suspension of the invention may also be used for the preparation of a catalytic converter.

Process of Preparation of the Suspension

The suspension of the invention is prepared by the method wherein a dispersion comprising a mixed oxide M dispersed in an aqueous liquid medium comprising the acid undergoes a mechanical treatment so as to reduce the size of the particles of the mixed oxide.

Preparation of the Dispersion to be Mechanically Treated

The mixed oxide M to be mechanically treated may have the same composition as the mixed oxide of the suspension. It may also have a substantially identical composition as the mixed oxide of the suspension. The mixed oxide M should preferably exhibit a D90 lower than 100 μm, more particularly lower than 60 μm, even more particularly lower than 50 μm.

Due to the decrease of the specific surface induced by the mechanical treatment, the mixed oxide M should exhibit a specific surface area typically higher than the claimed values, so that the specific surface of the suspension is within the claimed values. The specific surface area of the mixed oxide M to be mechanically treated should be:

higher than 17 $m^2/g$, preferably higher than 20 $m^2/g$, if the mixed oxide M does not comprise La nor RE; and higher than 25 $m^2/g$, preferably higher than 27 $m^2/g$, if the mixed oxide comprises La and/or RE, this specific surface area being determined after calcination in air at 1100° C. for 4 hours of the mixed oxide.

The mixed oxide M may be prepared according to the teachings of WO 2011/138255, WO 2016/037059, WO 2017/072509, EP 1527018 or EP 1621251. A convenient technique disclosed in EP 1527018 involves the following steps:

a) preparing a mixture comprising compounds of cerium, of lanthanum and optionally of RE and a sol of a zirconium compound;
b) adding to the mixture of step a) a solution of a basic compound whereby a precipitate is obtained;
c) heating said precipitate in an aqueous medium; and
d) calcining the precipitate thus obtained in step c).

More specifically, the recipe of the example of EP 1527018 can be followed or adapted for the preparation of a mixed oxide M, more particularly a mixed oxide comprising La and RE.

Another convenient technique disclosed in WO 2017185224 involves the following steps:

a) reacting a basic compound with an aqueous solution comprising at least a zirconium chloride salt, a cerium salt and optionally at least one rare earth salt, other than cerium salt and other than lanthanum salt, said aqueous solution containing sulphate anion ($SO_4^{2-}$), to form a precipitate;
b) separating off the precipitate from the liquid medium;
c) heating the precipitate obtained in step b) in an aqueous medium;
d) adding a lanthanum salt, optionally with a basic compound;
e) adding lauric acid;
f) separating off the precipitate from the liquid medium; and
g) calcining the precipitate.

More specifically, the recipes disclosed in the examples of WO 2017/185224 can be followed or adapted for the preparation of a mixed oxide M, more particularly a mixed oxide comprising La and/or RE.

The dispersion is prepared by dispersing the mixed oxide M in an aqueous liquid medium comprising the acid. The pH of the obtained dispersion is then optionally adjusted by the addition of an acid or a base. The pH of the dispersion is substantially the same as the pH of the final suspension. It is usual to prepare the dispersion by adding the mixed oxide M in the powder form into the aqueous liquid medium comprising the acid under a vigorous agitation in order to obtain an homogeneous dispersion.

The dispersion of the mixed oxide M undergoes a mechanical treatment so as to reduce the size of the particles. A device providing enough energy/shearing to reduce the size of the particles without affecting significantly the specific surface area is used. It is believed that the particles of the mixed oxide are in the form of agglomerates which are broken down into primary particles or smaller aggregates of primary particles. The device should also provide a good mixing to ensure a homogeneous treatment of the dispersion. The device may be high pressure homogenizer, wet jet mill, agitator bead mills, high shearing stirrer, ultrasonic homogenizer.

The high pressure homogenizer (HPH) consists in forcing the dispersion through a narrow gap (e.g. a nozzle with a diameter of 0.1-0.2 mm) at high pressure in the order of 1500 to 4000 bar, and then relaxing the dispersion through this nozzle to atmospheric pressure. The dispersion is then subjected to very high shear stress, cavitations, turbulences causing the disaggregation of the agglomerates. The shear is induced by the sudden restriction of the flow through the restrictive nozzle.

The technology of the wet-jet mill presents some similarities with the technology of HPH. In a wet jet mill, the dispersion is compressed in a chamber usually at 1500 to 2500 bar, and is divided into two flows which pass through two respective nozzles having a diameter of 0.1-0.2 mm. Then, the dispersion which is released from the nozzles at atmospheric pressure forms two jets of liquid. As the two nozzles are in opposite positions, the two jets collide at high speed against one another. The collision generates high shear stress to the particles and cause their de-agglomeration. This technology and HPH are better adapted to initial particles size below 60 μm, and dispersion viscosity below 5000 cP.

The technology of the agitator bead mills is based on the attrition of the solid with hard beads in contact with the solid and put into motion at high speed. The beads are often made of a hard material such as zirconia. The beads preferably exhibit a diameter which is lower than 500 μm, more particularly between 50 and 500 μm, even more particularly between 200 and 500 μm. The lower the diameter, the more beads can be added in contact with the solid; which makes it possible to obtain more collissions between the beads and particles of solid. More details about this technology may be found in the examples. The skilled person may use the conditions of wet milling disclosed in the examples to obtain the suspension as claimed. An agitator bead mill consists of a grinding container containing the beads and a means to put into motion the beads inside the container. Said means ensures an intensive movement of the beads inside the container. Different agitator bead mills available on the market may be used in the process of the invention. The technology of the agitator bead was conveniently used for the preparation of the suspensions disclosed in the examples.

EXAMPLES

Specific Surface (BET)

The surface area was determined by BET Flow method (multi point) with $N_2$ adsorption at liquid $N_2$ temperature (77 K) on a Micromeritics TRISTAR 3020 analyzer. The specific surface area was calculated by the well-known Brunauer-Emmett-Teller (BET) method. Prior to the measurements, the samples were pre-treated in a vacuum oven at 300° C. for 15 min to remove any residual moisture and adsorbed species.

As discussed above, the specific surface area (BET) of the suspension is determined on the solid isolated from the dispersion.

Hg Porosimetry

The pore volumes were determined with a Micromeritics Autopore IV 9500 Automatic Mercury Porosimeter following the guidelines of the constructor. A value of 130° was used for the contact angle (8) and the surface tension of mercury was fixed at 480 dyne/cm. Vacuum is made on samples up to 50 μm Hg. The mercury intrusion curves were collected in the pressure range from 0.98 Psi up to 30 Psi for low pressure slot and from 30 Psi up to 60000 Psi for high pressure slot; this enables the analysis of pores in the a large range, typically 3 nm-200 μm in diameter.

Particle Size Analysis

A laser particle size analyzer was used. A relative refractive index of 1.6 was used. The suspension (approx. 10 g) was diluted in an aqueous solution (60 mL) with a pH identical to the pH of the suspension. After sonication of the diluted suspension (5 min; 45 kHz) in an external ultrasound bath, the diluted suspension was introduced into the measuring cell. It is preferable that the measurement is made with a PIDS (polarization intensity differential scattering) in the range 45%-55% (45%<PIDS<55%).

Viscosity of the Suspension

A Malvern Kinexus Pro+ stress-controlled rheometer with a cylindrical couette geometry was used. The rheology of the suspension was measured at 20° C. The sample was first subjected to a shear rate increasing from 1 $s^{-1}$ to 100 $s^{-1}$ over a ramp time of 5 minutes, then to a shear rate decreasing from 100 $s^{-1}$ to 1 $s^{-1}$ also over 5 minutes. The viscosity value (V) which is retained is the value measured at a shear rate of 10 $s^{-1}$ during the decrease of the shear rate from 100 $s^{-1}$ to 1 $s^{-1}$.

XRD

X-ray powder diffraction patterns were acquired on an X'pertPro MPD powder diffractometer (PANAlytical Company) equipped with a Cu Kα (1.5406 Angstrom) radiation source and a linear detector X Celerator Detector. The scattered intensity data were collected from 2θ values of 19-85° by scanning at 0.017° steps with a counting time of 28 s at each step. Crystalline phases were identified by matching with the International Centre for Diffraction Data Powder Diffraction File (ICDD-PDF). The average crystallite size ($D_{SRD}$) of the samples was determined with the help of Scherrer equation from line broadening with taking into account the instrumental width and the lattice parameters were estimated by a standard cubic indexation method using the intensity of the most prominent peak (1 1 1).

For all examples 1-6 and comparative examples 1-2, use was made as a starting material of a mixed oxide M with the following composition (% expressed by weight of oxides): Zr/Ce/La 58.5%/36.0%/5.5% which is characterized by the following specific surface area: 29 $m^2/g$ after calcination in air at 1100° C. for 4 hours. This mixed oxide was prepared according to the teaching of EP 1527018 B1. The powder of the mixed oxide M used in the examples exhibits initially a D50 of 4.1 μm and a D90 of 11.5 μm. The crystallite size as determined by XRD was approximately 8 nm. It was observed that the crystallite size of the mixed oxide after the mechanical treatment remained substantially unchanged.

Example 1

A solution with 120 mL deionized water was prepared with 0.1 g acetic acid so as to reach a pH of 3.5. Then, the dispersion of mixed oxide was prepared by adding 80 g of M powder into this 120 mL solution. The pH of the dispersion was 6.2. The pH was further adjusted by adding drop by drop acetic acid (2.5 g acetic acid at 96 wt %) until a pH of 4.0 was obtained (final weight of the dispersion=202.6 g). The dispersion was homogenized for some hours under high stirring with a magnetic stirrer.

Then, for the wet milling, 116 mL of the homogeneous dispersion (167.8 g dispersion) were placed in a bowl of lab beads mill (container of 500 ml capacity, bowl diameter 10 cm) containing zirconia beads (605.5 g; average size 350 μm). The dispersion was milled in the bowl with beads agitator at 1500 rpm for 20 minutes (this corresponds to a duration of 300 minutes per kg oxide).

Example 2

Example 1 was reproduced under the same conditions as in example 1.

Example 3

Example 3 was reproduced under the conditions of example 1 except that the proportion of the mixed oxide M is lower: 25 wt % instead of 39 wt %. Characteristics of the suspension after milling: D50=70 nm and D90=250 nm. As can be seen in Table I, a decrease of D50 and D90 was observed with a more diluted suspension. The pH during milling also significantly increased from initial pH of 4.0 to pH 4.6. Measured viscosity of suspension is low at 3 cP for any shearing rate between 1 $s^{-1}$ to 1000 $s^{-1}$.

Example 4

This example was performed with a milling time of 40 min instead of 20 min for examples 1 and 2. The dispersion was prepared as in example 1. The slurry was milled in the bowl with beads stirring at 1500 rpm for 40 minutes. The increase of milling time leads to a reduction of particles size: D50=140 nm and D90=590 nm. It must be noted that, due to some losses of material on the surface of the bowl and on the beads, the proportion of the mixed oxide in the recovered suspension was found to be 36.6%.

Example 5

This example was performed with a pH of the dispersion higher than for example 1. The dispersion was prepared as in example 1, the proportion of the mixed oxide being 36.6% (after milling) and pH before milling being 6 instead of pH 4. The slurry is milled in the bowl with beads agitator at 1500 rpm for 40 minutes. Compared to example 4, the higher pH slightly affect D50 and D90 which tends to increase: D50=250 nm and D90=650 nm. The pH during milling also significantly increased from initial pH of 6.0 to pH 6.6.

Example 6

The acid used for the preparation of the dispersion was nitric acid instead of acetic acid. A dispersion of mixed oxide was prepared by adding 80 g of M powder into solution of 120 mL of deionized water plus some drops of nitric acid. The pH of the dispersion was 5.9. The pH was then adjusted by adding more nitric acid to get a final pH of 4.0 (in total 1.3 g of nitric acid at 69 wt % used). The final weight of suspension prepared was 201.3 g. The slurry was then milled in the bowl with the beads agitator at 1500 rpm for 40 minutes. Characteristics of the particles after milling: D50=180 nm and D90=590 nm.

Example 7

Example 7 was reproduced under the conditions of example 4 except that the mixed oxide M had a different composition (expressed by weight of oxides): Zr/Ce/La/Y 60.0%/30.0%/5.0%/5.0%. This mixed oxide was prepared by following the recipe of the example of EP 1527018 B1. The proportion of mixed oxide in the suspension was 36.9 wt %. The final pH was 4.7. The obtained suspension was as fluid as the suspension of example 4.

Example 8

Example 8 was reproduced under the conditions of examples 4 and 7 except that the mixed oxide M has a different composition (expressed by weight of oxides): Zr/Ce/LaN/Nd 45.0%/40.0%/2.0%/8.0%/5.0%. This mixed oxide was prepared by following the recipe of the example of EP 1527018 B1. The proportion of mixed oxide in the suspension is 37.8 wt %. The obtained suspension was as fluid as the suspension of example 7.

Example 9

Example 9 was reproduced under the conditions of examples 4 and 7 except that the mixed oxide M had a different composition (expressed by weight of oxides): Zr/Ce/La/Nd 63.0%/30.0%/1.75%/5.25%. The proportion of mixed oxide in the suspension was 34.1 wt %. The final pH of the suspension was 4.7. The obtained suspension was as fluid as the suspension of example 7.

Example 10

Example 10 was reproduced under the conditions of examples 4 and 7 except that the mixed oxide M had a different composition (expressed by weight of oxides): Zr/Ce/La/Y 50.0%/40.0%/5.0%/5.0%. The proportion of mixed oxide in the suspension was 23.0 wt %. The obtained suspension was as fluid as the suspension of example 7.

Example 11

Example 11 was reproduced under the conditions of example 10 except that the proportion of the mixed oxide M in the suspension was 19.0 wt %. The obtained suspension was as fluid as the suspension of example 7.

Example 12

Example 12 was reproduced under the conditions of examples 4 and 7 except that the mixed oxide M has a different composition (expressed by weight of oxides): Zr/Ce/La 59.0%/35.5%/5.5%. The proportion of mixed oxide in the suspension was 29.0 wt %. The final pH was 4.2. The pH during milling also increased from initial pH of 3.8 to pH 4.2. The obtained suspension was as fluid as suspension of example 4.

Comparative Example 1

The pH of the suspension was different than in the previous examples. The dispersion was prepared as in example 1 but at a pH of 7.0. It was observed that at this pH, the viscosity of the dispersion at around 39 wt % was much higher than for the suspension of example 1, so that the dispersion had to be diluted in to 34.4 wt % order to perform the milling for 30 min at 1500 rpm. After 30 minutes, the viscosity of the suspension became too high and milling was stopped. It was not possible to decrease D90 below 1 μm (D90=7.15 μm).

Comparative Example 2

A suspension at 27.8 wt % was prepared as in example 1 but without any acid. The pH of the suspension was 8.3. Milling was performed in the bowl with beads agitator at 1500 rpm for 30 minutes. After 30 minutes, the viscosity of suspension became too high and milling was stopped. It was observed that it was not possible to decrease D90 below 1 μm (D90=10.7 μm).

Table I provides the characteristics of the suspensions. D50 and D90 were obtained with a laser particle size analyzer LS13320 of Beckman-Coulter.

TABLE 1

| | BEADS MILLING STEP | | | | LASER GRANULOMETRY | | SPECIFIC SURFACE SSA | MERCURY POROSIMETRY TPV | | | XRD Primary particles |
|---|---|---|---|---|---|---|---|---|---|---|---|
| | Milling time min | Stabilizer | Solid content (% w/w) | pH | D50 (nm) | D90 (nm) | (1100° C./4 h) ($m^2/g$) | TPV (mL/g) | (0-300 nm) (mL/g) | V (cP) | size (nm) |
| REFERENCE* | 0 | Acetic acid | 39.5 | 4.0 | 4100 | 11500 | 27 | 1.11 | 0.58 | | 7.8 |
| EXAMPLE 1 | 20 | Acetic acid | 39 | 4.1 | 320 | 700 | | | | | |
| EXAMPLE 2 | 20 | Acetic acid | 39 | 4.1 | 420 | 790 | | | | | |
| EXAMPLE 3 | 20 | Acetic acid | 25 | 4.6 | 70 | 250 | 21 | 0.62 | 0.29 | 3 | |
| EXAMPLE 4 | 40 | Acetic acid | 36.6 | 4.2 | 140 | 590 | 24 | 0.62 | 0.29 | 8 | 7.9 |
| EXAMPLE 5 | 40 | Acetic acid | 36.6 | 6.6 | 250 | 650 | 25 | 0.73 | 0.38 | 50 | 7.9 |
| EXAMPLE 6 | 40 | Nitric acid | 36.3 | 5.0 | 180 | 590 | 21 | 0.63 | 0.32 | | |
| EXAMPLE 7 | 45 | Acetic acid | 36.9 | 4.7 | 66 | 88 | 21 | 0.5 | 0.45 | | |
| EXAMPLE 8 | 45 | Acetic acid | 37.8 | 4.1 | 60 | 80 | 23 | 0.52 | 0.25 | | |
| EXAMPLE 9 | 50 | Acetic acid | 34.1 | 4.7 | 65 | 89 | 19 | 0.57 | 0.28 | | |
| EXAMPLE 10 | 60 | Acetic acid | 23 | 4.0 | 70 | 90 | 21 | 0.50 | 0.24 | | |
| EXAMPLE 11 | 45 | Acetic acid | 19 | 4.0 | 60 | 80 | 22 | 0.56 | 0.24 | | |
| EXAMPLE 12 | 45 | Acetic acid | 29 | 4.2 | 70 | 90 | 23 | 0.51 | 0.25 | | |
| COUNTER-EXAMPLE 1 | 30 | Acetic acid | 34.4 | 7.4 | 550 | 7150 | 27 | 0.86 | 0.29 | 400 | |
| COUNTER-EXAMPLE 2 | 30 | None | 27.8 | 8.3 | 3520 | 10700 | 29 | 1.23 | 0.63 | | |

*Reference slurry at pH 4: unmilled.

** V: viscosity measured at shear rate of 10 s-1

The invention claimed is:

1. A suspension of particles of at least one mixed oxide consisting essentially of zirconium, of cerium, of optionally lanthanum, and optionally of at least one rare-earth element other than cerium and other than lanthanum (RE) in an aqueous liquid medium comprising an acid which is either a mineral acid or a carboxylic acid containing from 2 to 12 carbon atoms, the suspension having the following characteristics:

a pH of the suspension is between 2.0 and 7.0, this latter value being excluded;

a proportion of the mixed oxide is between 20.0 wt % and 50.0 wt %;

a specific surface area of the suspension is higher than 15 $m^2/g$ if the mixed oxide does not comprise La nor RE and higher than 21 $m^2/g$ if the mixed oxide comprises La and/or RE, the specific surface area being determined after calcination in air at 1100° C. for 4 hours of the solid isolated from the suspension, and a total pore volume TPV greater than 0.50 mL/g, wherein the TPV being determined by mercury porosimetry on a solid isolated by the method comprising the following steps:

(i) the solid is isolated from the suspension;

(ii) then, the solid is dried in air at 500° C. for 1 hour;

wherein:

the particles of the mixed oxide exhibit a D50 between 20.0 nm and 900 nm;

the proportions of the elements Ce, Zr, La and RE, expressed by weight of oxide with respect to the mixed oxide, are the following:

between 20.0 wt % and 55.0 wt % of cerium;

up to 10.0 wt % of lanthanum;

up to 15.0 wt % of the rare earth element(s) (RE(s)) other than cerium and other than lanthanum;

the remainder as zirconium.

2. The suspension according to claim 1, which consists of:

particles of at least one mixed oxide of zirconium, of cerium, of optionally lanthanum, and optionally of at least one rare-earth element other than cerium and other than lanthanum (RE);

an aqueous liquid medium; and an acid which is either a mineral acid or a carboxylic acid containing from 2 to 12 carbon atoms.

3. The suspension according to claim 1, wherein the mixed oxide also comprises the element hafnium, the proportion of which being lower or equal to 2.5 wt %, this proportion being expressed by weight of oxide with respect to the total weight of the mixed oxide.

4. The suspension according to claim 1, wherein the proportion of cerium in the mixed oxide is:

between 30.0 wt % and 55.0 wt %; or between 30.0 wt % and 45.0 wt %; or between 25.0 wt % and 35.0 wt %.

5. The suspension according to claim 1, wherein the proportion of lanthanum in the mixed oxide is between 1.0 wt % and 10.0 wt %.

6. The suspension according to claim 1, wherein the pH is between 3.0 and 6.0.

7. The suspension according to claim 1, wherein the acid is nitric acid or a carboxylic acid of formula $R^1$—COOH wherein $R^1$ is a linear or branched alkyl radical containing from 1 to 11 carbon atoms.

8. The suspension according to claim 7, wherein the acid is acetic acid.

9. The suspension according to claim 7, wherein the acid is a carboxylic acid containing at least one functional group other than COOH, which is selected from the group consisting of OH, C═O, anhydride and ester groups.

10. The suspension according to claim 1, wherein the suspension does not comprise any metal oxide other than the mixed oxide, the metal oxide being defined as an oxide of at least one metal.

11. The suspension according to claim 1, exhibiting a specific surface area (BET) of at least 35 $m^2/g$, the specific surface area being determined after calcination in air at 1000° C. for 4 hours of the solid isolated from the suspension.

12. The suspension according to claim 1, wherein the suspension exhibits a pore volume determined by mercury porosimetry for the pores having a diameter below 300 nm ($PV_{0\text{-}300\ nm}$) which is greater than 0.15 mL/g, $PV_{0\text{-}300\ nm}$ being determined by mercury porosimetry on a solid isolated by the method comprising the following steps:

(i) the solid is isolated from the suspension;

(ii) then, the solid is dried in air at 500° C. for 1 hour.

13. The suspension according to claim 1, wherein D50 is between 20.0 nm and 800.0 nm.

14. The suspension according to claim 1, wherein the suspension exhibits a viscosity V which is lower than 1000 cP, V being measured at 20° C. with a rheometer using a cylindrical couette geometry according to the following method: the sample is first subjected to a shear rate increasing from 1 $s^{-1}$ to 100 $s^{-1}$ over a ramp time of 5 minutes, then to a shear rate decreasing from 100 $s^{-1}$ to 1 $s^{-1}$ also over 5 minutes and the viscosity value (V) corresponds to the value measured at a shear rate of 10 $s^{-1}$ during the decrease of the shear rate.

15. The suspension according to claim 13, with a D50 between 20 nm and 100 nm and a D90 between 50 nm and 120 nm.

16. The suspension according to claim 1, wherein the weight ratio $ZrO_2/CeO_2$ is higher than 1.0.

17. A method of preparation of a suspension according to claim 1, comprising the step of performing a mechanical treatment on a dispersion comprising a mixed oxide M dispersed in an aqueous liquid medium comprising the acid so as to reduce the size of the particles of the mixed oxide.

18. The method according to claim 17 wherein the mechanical treatment is based on an attrition of the mixed oxide with beads in contact with the solid and put into motion.

19. A method of preparation of a catalytic composition wherein a suspension according to claim 1 is brought into contact with at least one mineral material and optionally at least one PGM.

* * * * *